US008177559B2

(12) United States Patent
Algüera Gallego et al.

(10) Patent No.: US 8,177,559 B2
(45) Date of Patent: May 15, 2012

(54) PLUG ELEMENT FOR CONNECTING SUPPLY LINES FOR VEHICLE PARTS

(75) Inventors: José Manuel Algüera Gallego, Aschaffenburg (DE); Michael Elermann, Pfungstadt (DE)

(73) Assignee: Jost-Werke GmbH, Neu-Isenburg (DE)

( * ) Notice: Subject to any disclaimer, the term of this patent is extended or adjusted under 35 U.S.C. 154(b) by 0 days.

(21) Appl. No.: 12/921,927

(22) PCT Filed: Mar. 12, 2009

(86) PCT No.: PCT/EP2009/052940
§ 371 (c)(1),
(2), (4) Date: Dec. 17, 2010

(87) PCT Pub. No.: WO2009/112554
PCT Pub. Date: Sep. 17, 2009

(65) Prior Publication Data
US 2011/0092080 A1 Apr. 21, 2011

(30) Foreign Application Priority Data

Mar. 13, 2008 (DE) .......................... 10 2008 014 572

(51) Int. Cl.
*H01R 13/64* (2006.01)
(52) U.S. Cl. ........................................................ 439/35
(58) Field of Classification Search .................... 439/34, 439/35, 246, 248, 310, 140; 280/420, 421, 280/433, 422
See application file for complete search history.

(56) References Cited

U.S. PATENT DOCUMENTS

| 2,510,125 | A | * | 6/1950 | Meakin | 174/47 |
| 3,673,541 | A | * | 6/1972 | Volinskie | 439/195 |
| 3,888,513 | A | * | 6/1975 | Pilz et al. | 280/421 |
| 5,026,085 | A | * | 6/1991 | Ducote | 280/426 |
| 5,060,964 | A | * | 10/1991 | Vick | 280/421 |
| 5,458,357 | A | * | 10/1995 | Wohlhuter | 280/420 |

(Continued)

FOREIGN PATENT DOCUMENTS

DE 9000214 U1 3/1990

(Continued)

OTHER PUBLICATIONS

International Preliminary Report on Patentability issued Oct. 14, 2010, in International Application No. PCT/EP2009/052940, 8 pages.

*Primary Examiner* — Alexander Gilman
(74) *Attorney, Agent, or Firm* — Brinks Hofer Gilson & Lione

(57) ABSTRACT

A plug element (1) for connecting supply lines of an articulated train with at least one line element (3) including a fluid contact (4) located in the housing (2) of said train, that is able to be brought into functional engagement with a second plug element (5). The plug element (1) remains in an operationally safe position without the pre-stressing force of a spring element (11a, 11b). The housing (2) of the plug element (1) can be moved laterally relative to a connection socket (6) that is fixed in space and the cross sectional area (AD1, AD2) for pressurization of the line element (3) is configured such that upon impingement with compressed air a force acts in the direction of insertion (8).

17 Claims, 2 Drawing Sheets

U.S. PATENT DOCUMENTS

| | | | |
|---|---|---|---|
| 6,481,738 B1 * | 11/2002 | Duncan et al. | 280/422 |
| 6,552,177 B2 * | 4/2003 | Horowitz et al. | 536/23.1 |
| 6,709,001 B1 * | 3/2004 | Morgan et al. | 280/421 |
| 7,258,559 B2 * | 8/2007 | Mattern et al. | 439/248 |
| 7,465,177 B2 * | 12/2008 | Wood | |
| 7,581,746 B2 * | 9/2009 | Abate et al. | 280/422 |
| 7,793,966 B2 * | 9/2010 | Richter et al. | 280/433 |
| 8,066,298 B2 * | 11/2011 | Alguera Gallego et al. | 280/420 |
| 2008/0036175 A1 * | 2/2008 | Alguera | 280/420 |
| 2009/0008903 A1 | 1/2009 | Richter et al. | 280/420 |

FOREIGN PATENT DOCUMENTS

DE   102004024333 A1   12/2005

\* cited by examiner

PLUG ELEMENT FOR CONNECTING SUPPLY LINES FOR VEHICLE PARTS

BACKGROUND

The invention relates to a plug element for connecting supply lines for vehicle parts, in the housing of which element at least one line element having a fluid contact configured on it is disposed, which contact can be brought into functional engagement with a second plug element. According to the invention, the plug element can also be implemented within a plug system.

A vehicle part is generally understood to be components of truck and trailer combinations having a towing vehicle and a trailer vehicle coupled to it. Furthermore, individual vehicle parts of an individual vehicle are also addressed. The trailer vehicle can particularly be a semi-trailer, which can be locked into a semi coupling of the towing vehicle, with shape fit, by means of a kingpin disposed on the underside.

After mechanically connecting the towing vehicle and the trailer vehicle, it is necessary to plug the supply lines that are usually kept available on the towing vehicle into connections of the trailer vehicle provided for this purpose, in order to ensure supply of the trailer vehicle with compressed air, electricity, and, if necessary, also with control signals.

From the state of the art, it has become known to perform plugging in of the supply lines in automated manner, using a plug coupling system. DE 10 2004 024 333 A1 proposes, in this regard, to provide a support element mounted so as to pivot about the kingpin on the side of the semi-trailer, on the underside of which support element a first plug element is disposed, which engages into a second plug element on the towing vehicle side, when such a vehicle is present, when the semi-trailer is coupled onto it, and produces a connection of the plug elements. The first plug element is mounted to be laterally displaceable with regard to the support element, and supports itself, with regard to the latter, by means of a helical spring. The plug elements that are in functional engagement with one another have compressed air applied to them during driving operation, thereby causing forces in the plug separation direction. For this reason, it is necessary to hold the plug elements together, in their connected position, by way of the pressure force of the helical spring. The significant disadvantage of the known plug coupling system lies in that in the event of a failure of the helical spring, separation of the plug elements and the resulting traffic hazards can occur.

Accordingly, the invention was based on the task of making available a plug element that remains in an operationally safe position without the biasing force of a spring element.

SUMMARY

This task is accomplished, according to the invention, with a plug element in which the housing is laterally displaceable with regard to a connection base that is fixed in place, and the pressure-effective surface area cross-section of the line element is configured in such a manner that when compressed air is applied, a force acts in the plug-in direction. After a quasi-stationary operating state has occurred, the line element acts like a piston on which the same prevailing pneumatic pressure acts from two sides. Because of the pressure-stressed surface area that is shaped to be greater on the side of the connection base, with regard to the fluid contact, a resulting force that acts in the plug-in direction occurs, as well, and thereby presses the plug element against the second plug element that interacts with it.

It is advantageous if the line element has a first sealing location with regard to the connection base, the diameter $D_1$ of which location is greater than the diameter $D_2$ of the fluid contact. In the assembled state of the plug elements, the pneumatic pressure force acts, among other things, on the pressure-effective surface area cross-section $A_{D2}$, corresponding to the wall thickness of the fluid contact in the region of the diameter $D_2$. In the opposite direction, however, the pneumatic pressure acts on a greater pressure-effective surface area cross-section $A_{D1}$ of the line element, whose contribution is greater by the square of the difference between the greater diameter $D_1$ and the smaller diameter $D_2$.

Because of the square dependence of the pressure-effective surface area cross-section on the radius or the diameter, respectively, even slight changes in the outside diameter D1 already lead to a significant increase in the pressure-effective surface area. Accordingly, a greater resulting force in the plug-in direction results from the constant pressure multiplied by the surface area that increases in square manner.

Preferably, the first sealing location is an elastomer or plastic seal. Likewise, an O-ring can be used as a seal. The O-ring allows a good seal, particularly when a line element is guided to be laterally movable in the connection base, relative to this element. Because of its circular sealing cross-section, this sealing function is maintained even in the case of a line element that enters into the connection base at an angle.

According to a particularly advantageous embodiment, the line element is attached to the housing in a fixed location. In this way, the advancing force of the line element that acts in the plug-in direction is transferred to the housing. An attachment in a fixed location is also understood to mean a resilient attachment to overcome tolerances that result from production technology.

It is practical if a spring element acts on the housing, which element is preferably disposed between the housing and the connection base. The spring element is particularly important before contacting of the plug element, since under some circumstances no pneumatic pressure force is as yet active within the plug element in this stage. However, an advancing force is necessary for the plug-in process, in other words the penetration of the fluid contact into the second plug element, and is advantageously applied by the spring element. After the plug elements have been connected, the spring element is relieved of stress because of the pneumatic force that then acts on the pressure-effective surface areas.

The spring element can be disposed, for example, coaxially on a guide rail that runs between the housing and the connection base. This ensures lateral guidance of the housing with regard to the connection base. Furthermore, the guide rail comprises an end stop that limits the displacement path of the housing.

It is advantageous if electrical contacts are disposed on the housing. Thus, not only an operationally reliable fluid connection, but also an electrical connection between the towing vehicle and the trailer vehicle is produced.

The invention is also implemented in a plug system that comprises a second plug element that interacts with the first plug element, where the first plug element is assigned to a towing vehicle and the second plug element is assigned to a trailer vehicle, where the trailer vehicle is a semi-trailer. The assignment of the first plug element to the towing vehicle has the advantage that the first plug element permanently has compressed air applied to it, and therefore the fluid contact is in a maximally extended position even before the semi-trailer is coupled on. In this embodiment, additional spring elements are not absolutely necessary.

It is also possible to assign the first plug element to a trailer vehicle and the second plug element to a towing vehicle, where the trailer vehicle is a semi-trailer.

It is advantageous if the first or second plug element is disposed below an access opening of a semi coupling, and the second or first plug element is disposed on a support element mounted so as to pivot about a kingpin of the semi-trailer. In this arrangement, contacting of the plug elements takes place when the kingpin is mechanically coupled in the semi coupling. This placement below the access opening allows the kingpin to slide over the plug element situated underneath, in each instance, without the latter being damaged by the kingpin.

Preferably, the plug element on the towing vehicle side is disposed on the semi coupling in a fixed location. As a result, the plug element performs the same scope of movement as the semi coupling and the semi-trailer or the support element attached to it, respectively, with the complementary plug element. Relative movements between the two plug elements are thereby reduced.

It is advantageous if the second plug element has at least one contact bushing on the side facing the first plug element, which bushing forms a second sealing location with the fluid contact that engages into it. The first and the second plug element should stand opposite one another immediately before being coupled, and thus guarantee problem-free engagement of the fluid contacts into the related contact bushings.

It is practical if the contact bushing has an inside diameter that is shaped to be slightly greater than the diameter $D_2$. This results not only in a small construction space but also in an advantageous seal between the contact bushing and the fluid contact situated in it. For this purpose, a sealing element should additionally be disposed in the contact bushing.

BRIEF DESCRIPTION OF THE DRAWINGS

For a better understanding, the invention will be explained in greater detail in the following, using three figures.

DESCRIPTION OF PREFERRED EMBODIMENTS

Figure 1:
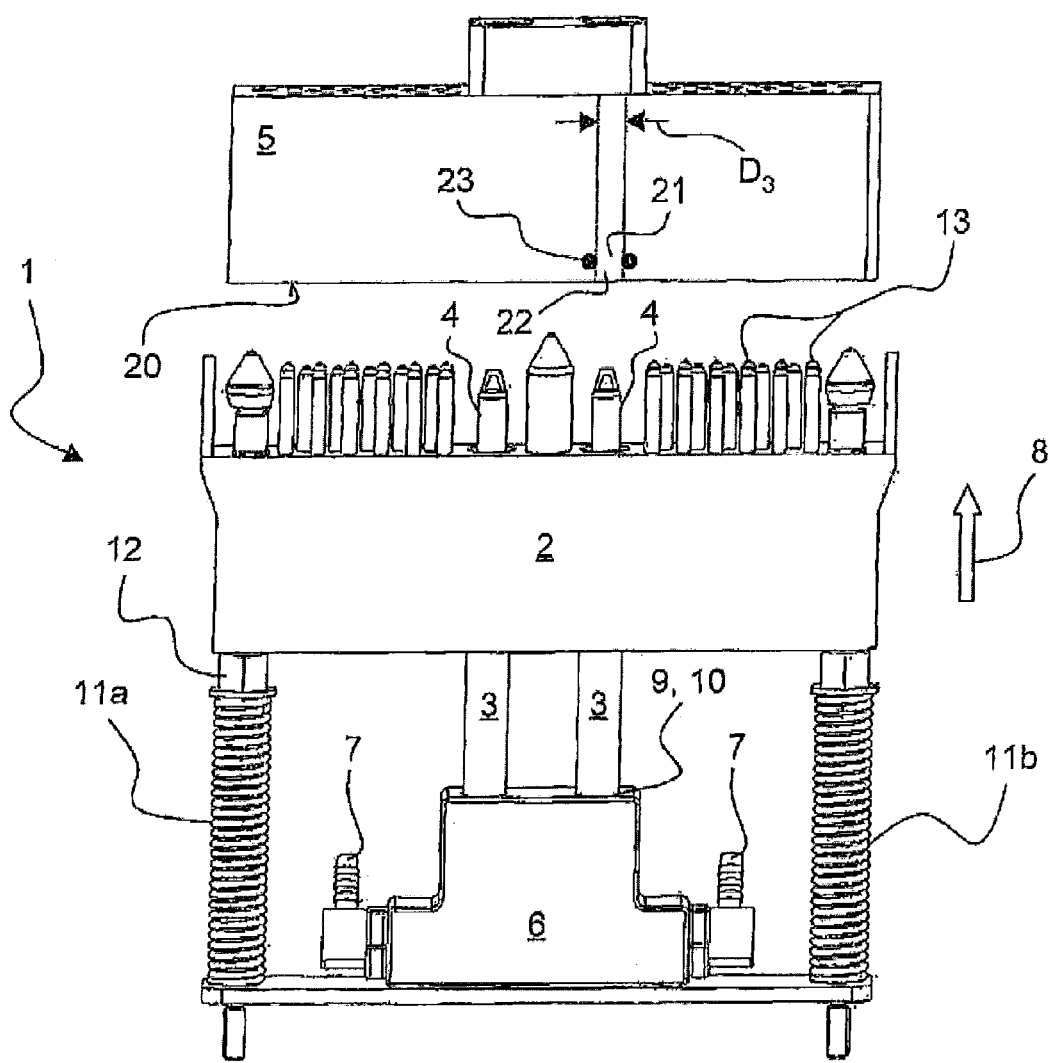
FIG. 1: a top view of a first and a second plug element.

FIG. 1 shows, in a top view, a plug element 1 and a second plug element 5 that stands opposite to it, where the plug element 5 is disposed on a towing vehicle (see FIG. 3) and the plug element 1 is disposed on a trailer vehicle 15 in the form of a semi-trailer. Fundamentally, the assignment of the plug element 1, 5, in each instance, to the towing vehicle 14 or to the trailer vehicle 15 is interchangeable, where placement of the first plug element 1 on the towing vehicle is preferred, because the towing vehicle permanently has compressed air applied to it.

The plug element 1 is composed of two parts and has a housing 2 that lies in the front in the plug-in direction, and a connection base 6 that is situated behind it. On the side of the housing 2 that is directed toward the second plug element 5, two fluid contacts 4 project, which increase their outer diameter within the housing 2 and leave it as a line element 3.

Aside from the fluid contacts 4, a plurality of electrical contacts 13 are furthermore disposed in the housing 2, which contacts serve for transmission of electrical energy and control signals, for example for a bus system.

In order to guarantee the most flow-advantageous possible feed of the compressed air through the line elements 3, the inside diameter of the line element 3 should be constant from the fluid contact 4, in each instance, to the connection base 6.

The two line elements 3 are attached to the housing 2 in a fixed location, and are mounted to be movable within the connection base 6. In the region of the entry of the line element 3 into the connection base 6, there is a first sealing location 9, which preferably is formed from an elastomer or plastic seal 10, and can be seen particularly well in the representation of FIG. 2.

The two line elements 3 run parallel to one another in the plug-in direction 8, from the connection base 6 to the housing 2. On the connection base 6, two connector pieces 7 can furthermore be seen, to which a supply line on the semi-trailer side, not shown here, can be connected.

The two fluid contacts 4 engage into opposite contact bushings 21 of the second plug element 5 when the first and second plug elements 1, 5 are brought together. These bushings are situated on the side 20 of the second plug element 5 that faces the plug element 1, where only one contact bushing 21 is shown schematically in FIG. 1.

Each of the contact bushings 21 furthermore has a second sealing location 22 on its inner wall, which seals the outer surface of the bushing by means of a sealing element 23 when a fluid contact 4 is present within the contact bushing 21. An elastomer or plastic seal or an O-ring is also suitable as a sealing element 23. The inside diameter $D_3$ of the contact bushing 21 is selected to be only slightly greater than the outside diameter $D_2$ (see FIG. 2) of the fluid contact, so that a particularly low-loss seal can take place.

On both sides of the connection base 6, the housing 2 is additionally supported, with regard to the base, with spring elements 11a, 11b, which are pushed axially onto guide rails 12. The guide rails 12 in turn permit an axial movement of the housing 2 in a predetermined scope of movement.

Figure 2:
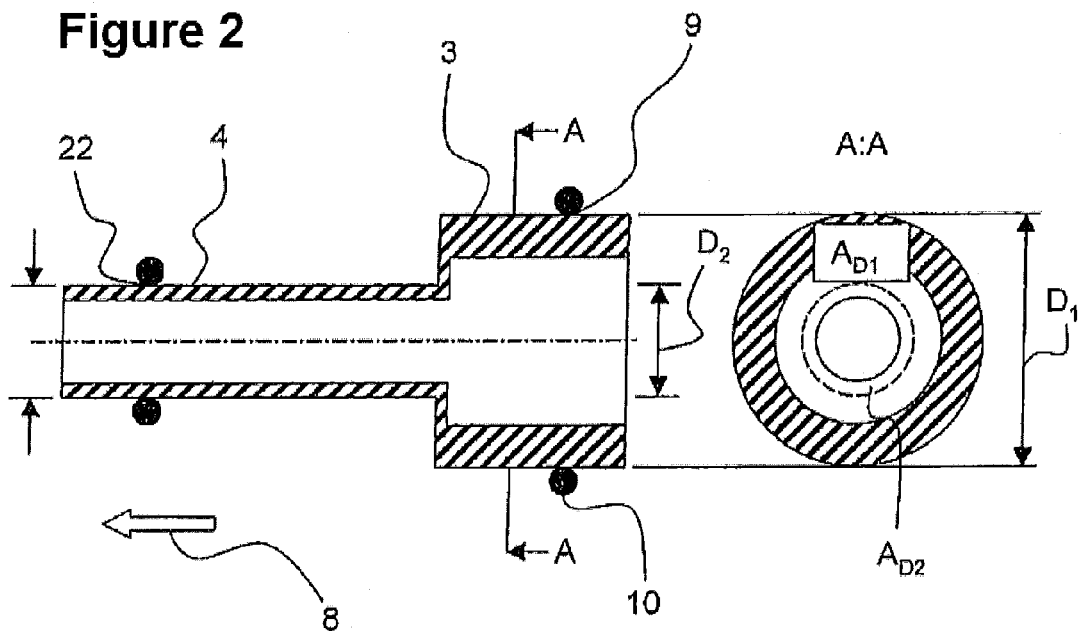
FIG. 2: a longitudinal and a transverse section through a line element.

After the two plug elements 1, 5 have been brought together, a pressure buildup occurs within the line element 3 and the subsequent compressed air circuit. An individual line element 3 is shown in FIG. 2 in its longitudinal and transverse cross-section. In this connection, it becomes clear that only the wall thickness of the fluid contact 4 plays a role as a pressure-effective surface area cross-section $A_{D2}$. The surface area cross-section $A_{D2}$ corresponds to the inner concentric circle in the cross-sectional representation. On the opposite side, in the region of the line element 3, which has a larger diameter, the compressed air impacts a greater pressure-effective surface area cross-section $A_{D1}$, so that a resulting advancing force in the plug-in direction 8 brings about displacement of the line element 3, with the housing 2 disposed on it, with regard to the connection base 6, which is fixed in place.

The pressure-effective surface area cross-section $A_{D1}$ is greater by the square of the difference between the diameter $D_1$ and the diameter $D_2$. In the cross-sectional representation of FIG. 2, the pressure-effective surface area cross-section $A_{D1}$ corresponds to the cross-hatched surface area and the adjacent non-cross-hatched surface area, up to the circle shown with a broken line, corresponding to the outer diameter $D_2$ of the circumference wall of the fluid contact 4.

Figure 3:
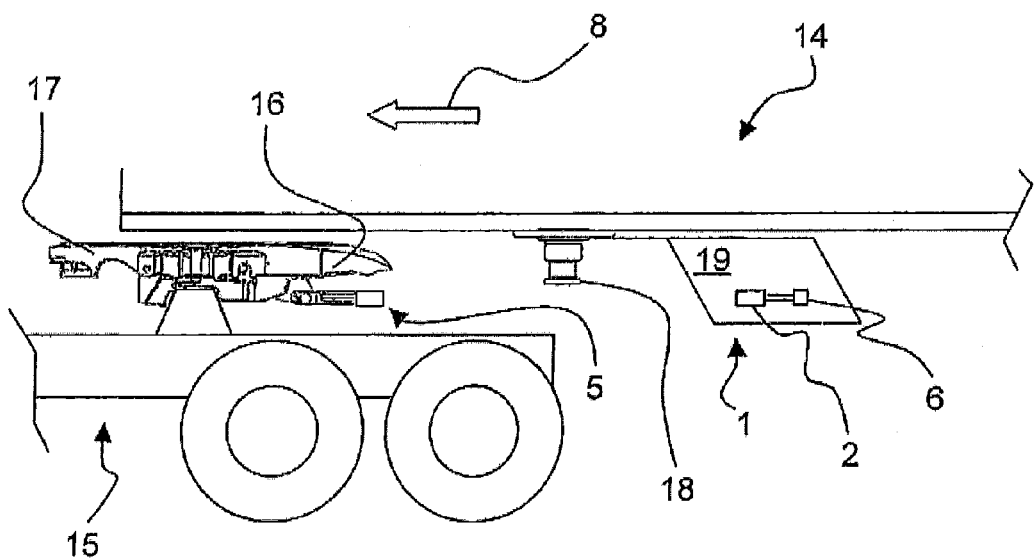
FIG. 3: a side view of a plug system affixed to a trailer vehicle and a semi-trailer.

FIG. 3, in a side view, shows the placement of the two plug elements 1, 5 on a truck and trailer combination, with a towing vehicle 14 and a semi-trailer 15. The towing vehicle 14, in its rear region, carries a semi coupling 17 having a conically widened access opening 16. For coupling the semi-trailer 15, the towing vehicle 14 drives backward toward it, until a kingpin 18 that projects from the underside of the semi-trailer is engaged by the access opening 16 and guided in this opening until its locking position is reached.

A support element 19 engages on the kingpin 18, so as to pivot, and this element makes the plug element 1 available. As the towing vehicle 14 and the semi-trailer 15 move closer together, the plug element 1 comes into functional engagement with the second plug element 5 attached to the semi coupling 17. This element is situated below the level of the access opening 16.

REFERENCE SYMBOL LIST 1 plug element, first plug element
2 housing
3 line element
4 fluid contact
5 second plug element
6 connection base
7 connector piece
8 plug-in direction
9 first sealing location
10 elastomer or plastic seal
11a, b spring element
12 guide rail
13 electrical contacts
14 towing vehicle
15 trailer vehicle, semi-trailer
16 access opening of semi coupling
17 semi coupling
18 kingpin
19 support element
20 side facing plug element
21 contact bushing
22 second sealing location
23 sealing element
$D_1$ outside diameter of line element at first sealing location
$D_2$ outside diameter of fluid contact
$D_3$ outside diameter of contact bushing
$A_{D1}$ pressure-effective surface area cross-section with reference to $D_1$
$A_{D2}$ pressure-effective surface area cross-section with reference to $D_2$

The invention claimed is:

1. Plug element (1) for connecting supply lines, in the housing (2) of which element at least one line element (3) having a fluid contact (4) configured on it is disposed, which contact can be brought into functional engagement with a second plug element (5),
characterized in that
the housing (2) is laterally displaceable with regard to a connection base (6) that is fixed in place, and the pressure-effective surface area cross-section ($A_{D1}$, $A_{D2}$) of the line element (3) is configured in such a manner that when compressed air is applied, a resulting force acts in the plug-in direction (8).

2. Plug element (1) according to claim 1, characterized in that the line element (3) has a first sealing location (9) with regard to the connection base (6), the pressure-effective surface area cross-section ($A_{D1}$) of which is greater than the pressure-effective surface area cross-section ($A_{D2}$) of the fluid contact (4).

3. Plug element (1) according to claim 2, characterized in that the first sealing location (9) is an elastomer or plastic seal (10).

4. Plug element (1) according to any of claims 1, or 2, or 3, characterized in that the line element (3) is attached to the housing (2) in a fixed location.

5. Plug element (1) according to claim 4, characterized in that the line element (3) is movably guided in the connection base (6).

6. Plug element (1) according to claim 4, characterized in that a spring element (11a, 11b) acts on the housing (2).

7. Plug element (1) according to claim 6, characterized in that the spring element (11a, 11b) is disposed between the housing (2) and the connection base (6).

8. Plug element (1) according to claim 6, characterized in that the spring element (11a, 11b) is disposed parallel on a guide rail (12) that runs between housing (2) and connection base (6).

9. Plug element (1) according to claim 4, characterized in that electrical contacts (13) are disposed on the housing (2).

10. Plug system comprising a first plug element (1) according to claim 4, and a second plug element (5) that interacts with the former, characterized in that the first plug element (1) is assigned to a towing vehicle (14) and the second plug element (5) is assigned to a trailer vehicle (15).

11. Plug system comprising a first plug element (1) according to claim 4, and a second plug element (5) that interacts with the former, characterized in that the first plug element (1) is assigned to a trailer vehicle (15) and the second plug element (5) is assigned to a towing vehicle (14).

12. Plug system according to claim 10, characterized in that the first or second plug element (1, 5) is disposed below an access opening (12) of a semi coupling (17), and the second or first plug element (5, 1) is disposed on a support element (19) mounted so as to pivot about a kingpin (18) of the semi-trailer.

13. Plug system according to claim 12, characterized in that the first or second plug element (1, 5) is disposed on the semi coupling (17) in a fixed location.

14. Plug system according to claim 10, characterized in that the first plug element (1) and the second plug element (5) stand opposite one another immediately before being coupled.

15. Plug system according to claim 10, characterized in that the second plug element (5) has at least one contact bushing (21) on the side facing the first plug element (1), which bushing forms a second sealing location (22) with the fluid contact (4) that engages in it.

16. Plug system according to claim 15, characterized in that the contact bushing (21) has an inside diameter ($D_3$) that is shaped to be slightly greater than the diameter ($D_2$).

17. Plug system according to claim 15, characterized in that a sealing element (23) is disposed in the contact bushing (21).

* * * * *